United States Patent
Mabon et al.

(10) Patent No.: US 8,826,790 B2
(45) Date of Patent: Sep. 9, 2014

(54) SAW BLADE

(75) Inventors: Keith Mabon, Jedburgh (GB); Andrew Lee, Jedburgh (GB)

(73) Assignee: The L.S. Starrett Company, Athol, MA (US)

( * ) Notice: Subject to any disclaimer, the term of this patent is extended or adjusted under 35 U.S.C. 154(b) by 727 days.

(21) Appl. No.: 12/500,551

(22) Filed: Jul. 9, 2009

(65) Prior Publication Data
US 2010/0037744 A1 Feb. 18, 2010

Related U.S. Application Data

(60) Provisional application No. 61/079,300, filed on Jul. 9, 2008.

(51) Int. Cl.
*B27B 33/02* (2006.01)
*B23D 61/12* (2006.01)
*B23D 61/02* (2006.01)
*B23D 65/02* (2006.01)

(52) U.S. Cl.
CPC ............ *B23D 61/121* (2013.01); *B23D 61/021* (2013.01); *B23D 65/02* (2013.01)
USPC .............................................. 83/835; 83/855

(58) Field of Classification Search
USPC ................................ 83/661, 835–855; 76/112
See application file for complete search history.

(56) References Cited

U.S. PATENT DOCUMENTS

| | | | |
|---|---|---|---|
| 552,370 A * | 12/1895 | Holley | 83/855 |
| 4,157,673 A | 6/1979 | Bruno | |
| 4,232,578 A * | 11/1980 | Stellinger et al. | 83/835 |
| 4,292,871 A * | 10/1981 | Neumeyer et al. | 83/835 |
| 4,587,876 A | 5/1986 | Erhardt | |
| 4,784,033 A | 11/1988 | Hayden et al. | |
| 4,867,026 A * | 9/1989 | Henning et al. | 83/835 |
| 5,946,985 A | 9/1999 | Carlsen et al. | |
| 6,119,571 A | 9/2000 | Hayden, Sr. | |
| 6,167,792 B1 * | 1/2001 | Korb et al. | 83/835 |
| 7,225,050 B2 | 5/2007 | Sutula, Jr. | |
| 2005/0028664 A1 | 2/2005 | Terada et al. | |
| 2005/0211046 A1 | 9/2005 | Thomas et al. | |
| 2006/0065098 A1* | 3/2006 | Cranna | 83/661 |
| 2007/0199416 A1 | 8/2007 | Cook et al. | |
| 2007/0214922 A1 | 9/2007 | Cook et al. | |

FOREIGN PATENT DOCUMENTS

JP 2000167713 * 6/2000

OTHER PUBLICATIONS

International Search Report and Written Opinion dated Sep. 3, 2009 issued in related International Patent Application No. PCT/US2009/050160.
Chinese Office Action dated Jan. 31, 2012 issued in related Chinese Patent Application No. 200980126519.1 (4 pages).
Chinese Office Action issued Oct. 31, 2012 in connection with corresponding Chinese Patent Appln No. 200980126519.1.

* cited by examiner

*Primary Examiner* — Stephen Choi
(74) *Attorney, Agent, or Firm* — Grossman, Tucker, Perreault & Pfleger, PLLC

(57) ABSTRACT

A saw blade including a base and a plurality of teeth extending generally outwardly from the base. At least one of the plurality of teeth comprises a first and a second portion. The first portion includes a cutting tip having an initial rake angle and the second portion includes a cutting tip having a second rake angle greater than the initial rake angle. The second portion is disposed closer to the base than the first portion.

22 Claims, 16 Drawing Sheets

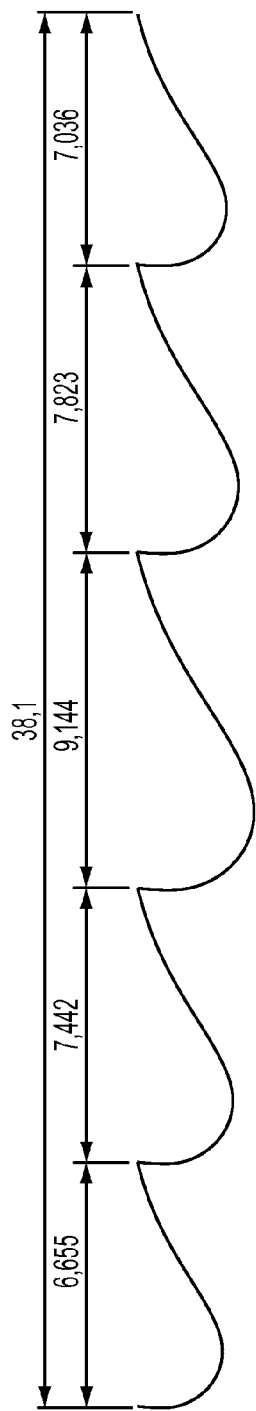
FIG. 3A
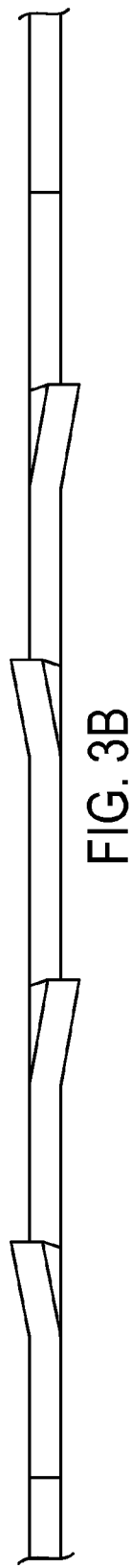
FIG. 3B
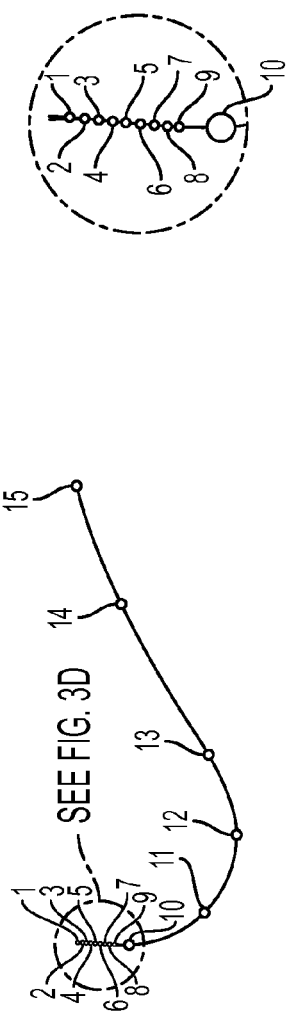
FIG. 3C
FIG. 3D

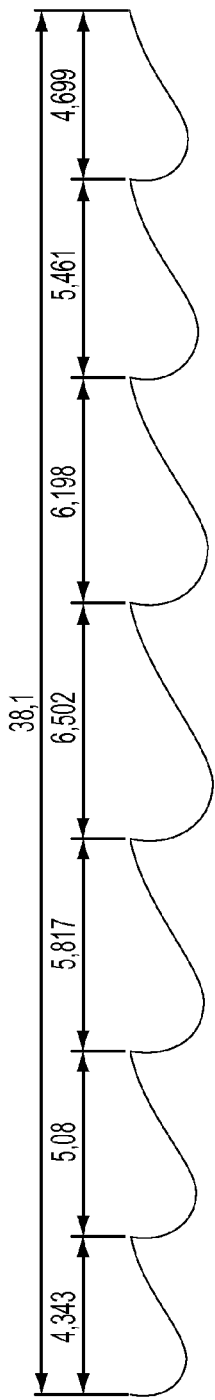
FIG. 4A
FIG. 4B
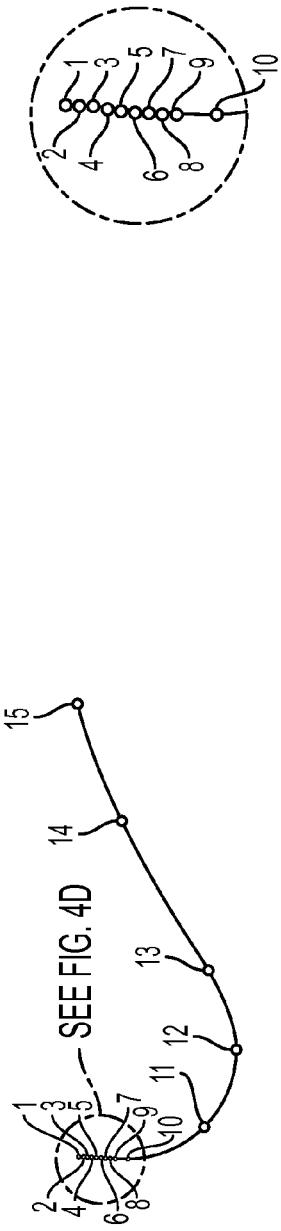
FIG. 4C
FIG. 4D

| POSITION | 9.525 GULLET | | 15.875 GULLET | | 12.700 GULLET | |
|---|---|---|---|---|---|---|
| | x COORD (MM) | y COORD (MM) | x COORD (MM) | y COORD (MM) | x COORD (MM) | y COORD (MM) |
| 1 | 0.000 | 0.000 | 0.000 | 0.000 | 0.000 | 0.000 |
| 2 | -0.004 | -0.095 | -0.006 | -0.158 | -0.005 | -0.126 |
| 3 | -0.011 | -0.189 | -0.018 | -0.315 | -0.015 | -0.252 |
| 4 | -0.025 | -0.287 | -0.042 | -0.479 | -0.034 | -0.383 |
| 5 | -0.044 | -0.382 | -0.073 | -0.636 | -0.058 | -0.509 |
| 6 | -0.055 | -0.476 | -0.091 | -0.794 | -0.073 | -0.635 |
| 7 | -0.062 | -0.571 | -0.103 | -0.951 | -0.082 | -0.761 |
| 8 | -0.065 | -0.665 | -0.109 | -1.109 | -0.087 | -0.887 |
| 9 | -0.065 | -0.763 | -0.109 | -1.272 | -0.087 | -1.018 |
| 10 | -0.065 | -1.043 | -0.109 | -1.739 | -0.087 | -1.391 |
| 11 | 0.604 | -2.661 | 1.006 | -4.435 | 0.805 | -3.548 |
| 12 | 2.225 | -3.334 | 3.708 | -5.556 | 2.967 | -4.445 |
| 13 | 3.902 | -2.719 | 6.503 | -4.532 | 5.202 | -3.626 |
| 14 | 7.053 | -0.898 | 11.755 | -1.497 | 9.404 | -1.197 |
| 15 | 9.525 | 0.000 | 15.875 | 0.000 | 12.700 | 0.000 |

FIG. 12

| POSITION | 6.655 x COORD (MM) | GULLET y COORD (MM) | 7.442 x COORD (MM) | GULLET y COORD (MM) | 9.144 x COORD (MM) | GULLET y COORD (MM) | 7.823 x COORD (MM) | GULLET y COORD (MM) | 7.036 x COORD (MM) | GULLET y COORD (MM) |
|---|---|---|---|---|---|---|---|---|---|---|
| 1 | 0.000 | 0.000 | 0.000 | 0.000 | 0.000 | 0.000 | 0.000 | 0.000 | 0.000 | 0.000 |
| 2 | -0.003 | -0.066 | -0.003 | -0.074 | -0.003 | -0.091 | -0.003 | -0.078 | -0.003 | -0.070 |
| 3 | -0.008 | -0.132 | -0.009 | -0.148 | -0.010 | -0.181 | -0.009 | -0.155 | -0.008 | -0.140 |
| 4 | -0.018 | -0.201 | -0.020 | -0.224 | -0.024 | -0.276 | -0.021 | -0.236 | -0.019 | -0.212 |
| 5 | -0.030 | -0.267 | -0.034 | -0.298 | -0.042 | -0.366 | -0.036 | -0.314 | -0.032 | -0.282 |
| 6 | -0.038 | -0.333 | -0.043 | -0.372 | -0.052 | -0.457 | -0.045 | -0.391 | -0.040 | -0.352 |
| 7 | -0.043 | -0.399 | -0.048 | -0.446 | -0.059 | -0.548 | -0.051 | -0.469 | -0.046 | -0.422 |
| 8 | -0.046 | -0.465 | -0.051 | -0.520 | -0.063 | -0.639 | -0.054 | -0.546 | -0.048 | -0.491 |
| 9 | -0.046 | -0.533 | -0.051 | -0.597 | -0.063 | -0.733 | -0.054 | -0.627 | -0.048 | -0.564 |
| 10 | -0.046 | -0.729 | -0.051 | -0.815 | -0.063 | -1.002 | -0.054 | -0.857 | -0.048 | -0.771 |
| 11 | 0.422 | -1.859 | 0.472 | -2.079 | 0.579 | -2.555 | 0.496 | -2.186 | 0.446 | -1.966 |
| 12 | 1.554 | -2.329 | 1.738 | -2.605 | 2.136 | -3.200 | 1.827 | -2.738 | 1.643 | -2.463 |
| 13 | 2.726 | -1.900 | 3.048 | -2.125 | 3.746 | -2.611 | 3.205 | -2.233 | 2.882 | -2.009 |
| 14 | 4.928 | -0.627 | 5.511 | -0.702 | 6.771 | -0.862 | 5.793 | -0.738 | 5.210 | -0.663 |
| 15 | 6.655 | 0.000 | 7.442 | 0.000 | 9.144 | 0.000 | 7.823 | 0.000 | 7.036 | 0.000 |

FIG. 13

| POSITION | 4.343 GULLET x COORD (MM) | y COORD (MM) | 5.080 GULLET x COORD (MM) | y COORD (MM) | 5.817 GULLET x COORD (MM) | y COORD (MM) | 6.502 GULLET x COORD (MM) | y COORD (MM) | 6.198 GULLET x COORD (MM) | y COORD (MM) | 5.461 GULLET x COORD (MM) | y COORD (MM) | 4.699 GULLET x COORD (MM) | y COORD (MM) |
|---|---|---|---|---|---|---|---|---|---|---|---|---|---|---|
| 1 | 0.000 | 0.000 | 0.000 | 0.000 | 0.000 | 0.000 | 0.000 | 0.000 | 0.000 | 0.000 | 0.000 | 0.000 | 0.000 | 0.000 |
| 2 | -0.002 | -0.043 | -0.002 | -0.050 | -0.002 | -0.058 | -0.002 | -0.065 | -0.002 | -0.062 | -0.002 | -0.054 | -0.002 | -0.047 |
| 3 | -0.005 | -0.086 | -0.006 | -0.101 | -0.007 | -0.115 | -0.007 | -0.129 | -0.007 | -0.123 | -0.006 | -0.108 | -0.005 | -0.093 |
| 4 | -0.012 | -0.131 | -0.014 | -0.153 | -0.016 | -0.175 | -0.017 | -0.196 | -0.017 | -0.187 | -0.015 | -0.165 | -0.013 | -0.142 |
| 5 | -0.020 | -0.174 | -0.023 | -0.204 | -0.027 | -0.233 | -0.030 | -0.261 | -0.028 | -0.248 | -0.025 | -0.219 | -0.022 | -0.188 |
| 6 | -0.025 | -0.217 | -0.029 | -0.254 | -0.033 | -0.291 | -0.037 | -0.325 | -0.035 | -0.310 | -0.031 | -0.273 | -0.027 | -0.235 |
| 7 | -0.028 | -0.260 | -0.033 | -0.304 | -0.038 | -0.349 | -0.042 | -0.390 | -0.040 | -0.371 | -0.035 | -0.327 | -0.030 | -0.282 |
| 8 | -0.030 | -0.303 | -0.035 | -0.355 | -0.040 | -0.406 | -0.045 | -0.454 | -0.043 | -0.433 | -0.038 | -0.381 | -0.032 | -0.328 |
| 9 | -0.030 | -0.348 | -0.035 | -0.407 | -0.040 | -0.466 | -0.045 | -0.521 | -0.043 | -0.497 | -0.038 | -0.438 | -0.032 | -0.377 |
| 10 | -0.030 | -0.476 | -0.035 | -0.556 | -0.040 | -0.637 | -0.045 | -0.712 | -0.043 | -0.679 | -0.038 | -0.598 | -0.032 | -0.515 |
| 11 | 0.275 | -1.213 | 0.322 | -1.419 | 0.369 | -1.625 | 0.412 | -1.817 | 0.393 | -1.732 | 0.346 | -1.526 | 0.298 | -1.313 |
| 12 | 1.015 | -1.520 | 1.187 | -1.778 | 1.359 | -2.036 | 1.519 | -2.276 | 1.448 | -2.169 | 1.276 | -1.911 | 1.098 | -1.645 |
| 13 | 1.779 | -1.240 | 2.081 | -1.450 | 2.383 | -1.661 | 2.664 | -1.856 | 2.539 | -1.769 | 2.237 | -1.559 | 1.925 | -1.342 |
| 14 | 3.216 | -0.409 | 3.762 | -0.479 | 4.307 | -0.548 | 4.815 | -0.613 | 4.589 | -0.584 | 4.044 | -0.515 | 3.479 | -0.443 |
| 15 | 4.343 | 0.000 | 5.080 | 0.000 | 5.817 | 0.000 | 6.502 | 0.000 | 6.198 | 0.000 | 5.461 | 0.000 | 4.699 | 0.000 |

FIG. 14

| POSITION | 3.226 GULLET x COORD (MM) | y COORD (MM) | 3.708 GULLET x COORD (MM) | y COORD (MM) | 4.242 GULLET x COORD (MM) | y COORD (MM) | 4.750 GULLET x COORD (MM) | y COORD (MM) | 5.258 GULLET x COORD (MM) | y COORD (MM) | 5.004 GULLET x COORD (MM) | y COORD (MM) | 4.496 GULLET x COORD (MM) | y COORD (MM) | 3.962 GULLET x COORD (MM) | y COORD (MM) | 3.454 GULLET x COORD (MM) | y COORD (MM) |
|---|---|---|---|---|---|---|---|---|---|---|---|---|---|---|---|---|---|---|
| 1 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 |
| 2 | -0.001 | -0.032 | -0.001 | -0.037 | -0.002 | -0.042 | -0.002 | -0.047 | -0.002 | -0.052 | -0.002 | -0.050 | -0.002 | -0.045 | -0.002 | -0.039 | -0.001 | -0.034 |
| 3 | -0.004 | -0.064 | -0.004 | -0.074 | -0.005 | -0.084 | -0.005 | -0.094 | -0.006 | -0.104 | -0.006 | -0.099 | -0.005 | -0.089 | -0.005 | -0.079 | -0.004 | -0.069 |
| 4 | -0.009 | -0.097 | -0.010 | -0.112 | -0.011 | -0.128 | -0.013 | -0.143 | -0.014 | -0.159 | -0.013 | -0.151 | -0.012 | -0.136 | -0.011 | -0.119 | -0.009 | -0.104 |
| 5 | -0.015 | -0.129 | -0.017 | -0.149 | -0.019 | -0.170 | -0.022 | -0.190 | -0.024 | -0.211 | -0.023 | -0.201 | -0.021 | -0.180 | -0.018 | -0.159 | -0.016 | -0.138 |
| 6 | -0.018 | -0.161 | -0.021 | -0.185 | -0.024 | -0.212 | -0.027 | -0.237 | -0.030 | -0.263 | -0.029 | -0.250 | -0.026 | -0.225 | -0.023 | -0.198 | -0.020 | -0.173 |
| 7 | -0.021 | -0.193 | -0.024 | -0.222 | -0.028 | -0.254 | -0.031 | -0.285 | -0.034 | -0.315 | -0.032 | -0.300 | -0.029 | -0.269 | -0.026 | -0.237 | -0.022 | -0.207 |
| 8 | -0.022 | -0.225 | -0.025 | -0.259 | -0.029 | -0.296 | -0.033 | -0.332 | -0.036 | -0.367 | -0.034 | -0.350 | -0.031 | -0.314 | -0.027 | -0.277 | -0.024 | -0.241 |
| 9 | -0.022 | -0.259 | -0.025 | -0.297 | -0.029 | -0.340 | -0.033 | -0.381 | -0.036 | -0.421 | -0.034 | -0.401 | -0.031 | -0.360 | -0.027 | -0.318 | -0.024 | -0.277 |
| 10 | -0.022 | -0.353 | -0.025 | -0.406 | -0.029 | -0.465 | -0.033 | -0.520 | -0.036 | -0.576 | -0.034 | -0.548 | -0.031 | -0.492 | -0.027 | -0.434 | -0.024 | -0.378 |
| 11 | 0.204 | -0.901 | 0.235 | -1.036 | 0.269 | -1.185 | 0.301 | -1.327 | 0.333 | -1.469 | 0.317 | -1.398 | 0.285 | -1.256 | 0.251 | -1.107 | 0.219 | -0.965 |
| 12 | 0.754 | -1.129 | 0.866 | -1.298 | 0.991 | -1.485 | 1.109 | -1.662 | 1.228 | -1.840 | 1.169 | -1.751 | 1.050 | -1.574 | 0.926 | -1.387 | 0.807 | -1.209 |
| 13 | 1.321 | -0.921 | 1.519 | -1.059 | 1.738 | -1.211 | 1.946 | -1.356 | 2.154 | -1.501 | 2.050 | -1.429 | 1.842 | -1.284 | 1.623 | -1.131 | 1.415 | -0.986 |
| 14 | 2.389 | -0.304 | 2.746 | -0.350 | 3.141 | -0.400 | 3.517 | -0.448 | 3.893 | -0.496 | 3.705 | -0.472 | 3.329 | -0.424 | 2.934 | -0.374 | 2.558 | -0.326 |
| 15 | 3.226 | 0.000 | 3.708 | 0.000 | 4.242 | 0.000 | 4.750 | 0.000 | 5.258 | 0.000 | 5.004 | 0.000 | 4.496 | 0.000 | 3.962 | 0.000 | 3.454 | 0.000 |

FIG. 15

| POSITION | 2.489 GULLET x COORD (MM) | y COORD (MM) | 2.845 GULLET x COORD (MM) | y COORD (MM) | 3.251 GULLET x COORD (MM) | y COORD (MM) | 3.658 GULLET x COORD (MM) | y COORD (MM) | 4.064 GULLET x COORD (MM) | y COORD (MM) | 4.445 GULLET x COORD (MM) | y COORD (MM) | 4.267 GULLET x COORD (MM) | y COORD (MM) | 3.861 GULLET x COORD (MM) | y COORD (MM) | 3.480 GULLET x COORD (MM) | y COORD (MM) | 3.048 GULLET x COORD (MM) | y COORD (MM) | 2.692 GULLET x COORD (MM) | y COORD (MM) |
|---|---|---|---|---|---|---|---|---|---|---|---|---|---|---|---|---|---|---|---|---|---|---|
| 1 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 |
| 2 | -0.001 | -0.025 | -0.001 | -0.028 | -0.001 | -0.032 | -0.001 | -0.036 | -0.002 | -0.040 | -0.002 | -0.044 | -0.002 | -0.042 | -0.001 | -0.038 | -0.001 | -0.035 | -0.001 | -0.030 | 0.000 | -0.027 |
| 3 | -0.003 | -0.049 | -0.003 | -0.056 | -0.004 | -0.065 | -0.004 | -0.073 | -0.005 | -0.081 | -0.005 | -0.088 | -0.005 | -0.085 | -0.004 | -0.077 | -0.004 | -0.069 | -0.003 | -0.060 | -0.003 | -0.053 |
| 4 | -0.007 | -0.075 | -0.008 | -0.086 | -0.009 | -0.098 | -0.010 | -0.110 | -0.011 | -0.123 | -0.012 | -0.134 | -0.011 | -0.129 | -0.010 | -0.116 | -0.009 | -0.105 | -0.008 | -0.092 | -0.007 | -0.081 |
| 5 | -0.011 | -0.100 | -0.013 | -0.114 | -0.015 | -0.130 | -0.017 | -0.147 | -0.019 | -0.163 | -0.020 | -0.178 | -0.020 | -0.171 | -0.018 | -0.155 | -0.016 | -0.139 | -0.014 | -0.122 | -0.012 | -0.108 |
| 6 | -0.014 | -0.124 | -0.016 | -0.142 | -0.019 | -0.163 | -0.021 | -0.183 | -0.023 | -0.203 | -0.025 | -0.222 | -0.024 | -0.213 | -0.022 | -0.193 | -0.020 | -0.174 | -0.017 | -0.152 | -0.015 | -0.135 |
| 7 | -0.016 | -0.149 | -0.018 | -0.170 | -0.021 | -0.195 | -0.024 | -0.219 | -0.026 | -0.244 | -0.029 | -0.266 | -0.028 | -0.256 | -0.025 | -0.231 | -0.023 | -0.209 | -0.020 | -0.183 | -0.017 | -0.161 |
| 8 | -0.017 | -0.174 | -0.020 | -0.199 | -0.022 | -0.227 | -0.025 | -0.255 | -0.028 | -0.284 | -0.031 | -0.310 | -0.029 | -0.298 | -0.027 | -0.270 | -0.024 | -0.243 | -0.021 | -0.213 | -0.018 | -0.188 |
| 9 | -0.017 | -0.200 | -0.020 | -0.228 | -0.022 | -0.261 | -0.025 | -0.293 | -0.028 | -0.326 | -0.031 | -0.356 | -0.029 | -0.342 | -0.027 | -0.309 | -0.024 | -0.279 | -0.021 | -0.244 | -0.018 | -0.216 |
| 10 | -0.017 | -0.273 | -0.020 | -0.312 | -0.022 | -0.356 | -0.025 | -0.401 | -0.028 | -0.445 | -0.031 | -0.487 | -0.029 | -0.467 | -0.027 | -0.423 | -0.024 | -0.381 | -0.021 | -0.334 | -0.018 | -0.295 |
| 11 | 0.158 | -0.695 | 0.180 | -0.795 | 0.206 | -0.908 | 0.232 | -1.022 | 0.257 | -1.135 | 0.282 | -1.242 | 0.270 | -1.192 | 0.245 | -1.079 | 0.220 | -0.972 | 0.193 | -0.852 | 0.171 | -0.752 |
| 12 | 0.631 | -0.871 | 0.665 | -0.996 | 0.759 | -1.138 | 0.854 | -1.280 | 0.949 | -1.422 | 1.033 | -1.556 | 0.997 | -1.494 | 0.902 | -1.351 | 0.813 | -1.218 | 0.712 | -1.067 | 0.629 | -0.942 |
| 13 | 1.020 | -0.711 | 1.165 | -0.812 | 1.332 | -0.928 | 1.498 | -1.044 | 1.665 | -1.160 | 1.821 | -1.269 | 1.748 | -1.218 | 1.581 | -1.102 | 1.425 | -0.993 | 1.249 | -0.870 | 1.103 | -0.769 |
| 14 | 1.843 | -0.235 | 2.106 | -0.268 | 2.407 | -0.307 | 2.708 | -0.345 | 3.009 | -0.383 | 3.291 | -0.419 | 3.160 | -0.402 | 2.859 | -0.364 | 2.577 | -0.328 | 2.257 | -0.287 | 1.994 | -0.254 |
| 15 | 2.489 | 0.000 | 2.845 | 0.000 | 3.251 | 0.000 | 3.658 | 0.000 | 4.064 | 0.000 | 4.445 | 0.000 | 4.267 | 0.000 | 3.861 | 0.000 | 3.480 | 0.000 | 3.048 | 0.000 | 2.692 | 0.000 |

FIG. 16

SAW BLADE

CROSS-REFERENCE TO RELATED APPLICATIONS

This application claims the benefit of U.S. Provisional Application Ser. No. 61/079,300, filed Jul. 9, 2008 and entitled SAW BLADE, which is incorporated herein fully by reference.

TECHNICAL FIELD

The present disclosure generally relates to the field of saw blades for cutting wood and other materials.

BACKGROUND

The teeth of a band saw blade may work as tiny planing tools that generate chips at a high speed by planing and/or tearing, the chips being collected and removed in the tooth gullets. Generally, a band saw blade is replaced because of tooth wear, stress or some other performance limiting problem. Tooth wear may result from overheating of the blade tip, which causes the tip to loose hardness. A worn blade, such as a blade with worn teeth, causes an undesirable loss in efficiency that may cause the blade to break due to increased stress. In addition, a worn blade may cause damage to the band saw body that is pulling the blade. A worn blade also increases power requirements thereby increasing the energy expense of the sawing operation.

BRIEF DESCRIPTION OF THE DRAWINGS

Features and advantages of embodiments of the disclosed subject matter will become apparent as the following Detailed Description proceeds, and upon reference to the Drawings, where like numerals depict like parts, and in which:

FIG. 3A is a side view of another embodiment of a saw blade consistent with the present disclosure;

FIG. 3B is a top view of the saw blade illustrated in FIG. 3A;

FIG. 3C is a detailed view of the tooth geometry of a tooth of the blade illustrated in FIG. 3A.

FIG. 3D is a detailed view of a tip portion of the tooth shown in FIG. 3C;

FIG. 4A is a side view of another embodiment of a saw blade consistent with the present disclosure;

FIG. 4B is a top view of the saw blade illustrated in FIG. 4A;

FIG. 4C is a detailed view of the tooth geometry of a tooth of the blade illustrated in FIG. 4A.

FIG. 4D is a detailed view of a tip portion of the tooth shown in FIG. 4C;

FIG. 12 is a table of the position numbers and coordinates corresponding to FIG. 2;

FIG. 13 is a table of the position numbers and coordinates corresponding to FIG. 3;

FIG. 14 is a table of the position numbers and coordinates corresponding to FIG. 4;

FIG. 15 is a table of the position numbers and coordinates corresponding to FIG. 5;

FIG. 16 is a table of the position numbers and coordinates corresponding to FIG. 6;

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Definitions of typical saw blade terminology and features are discussed with reference to a blade of the prior art shown in FIGS. 1A-1B. One exemplary embodiment of a saw blade consistent with the present disclosure is then discussed with reference to FIGS. 2 through 7. Although the description provided herein is with reference to various exemplary band saw blade embodiments, it is to be understood that the embodiments described herein are presented by way of illustration, not of limitation. A saw blade consistent with the present disclosure may be used for saws other than band saws. Also, a saw blade consistent with the present disclosure may be incorporated into a variety of systems without departing from the spirit and scope of the invention.

Figure 1A:
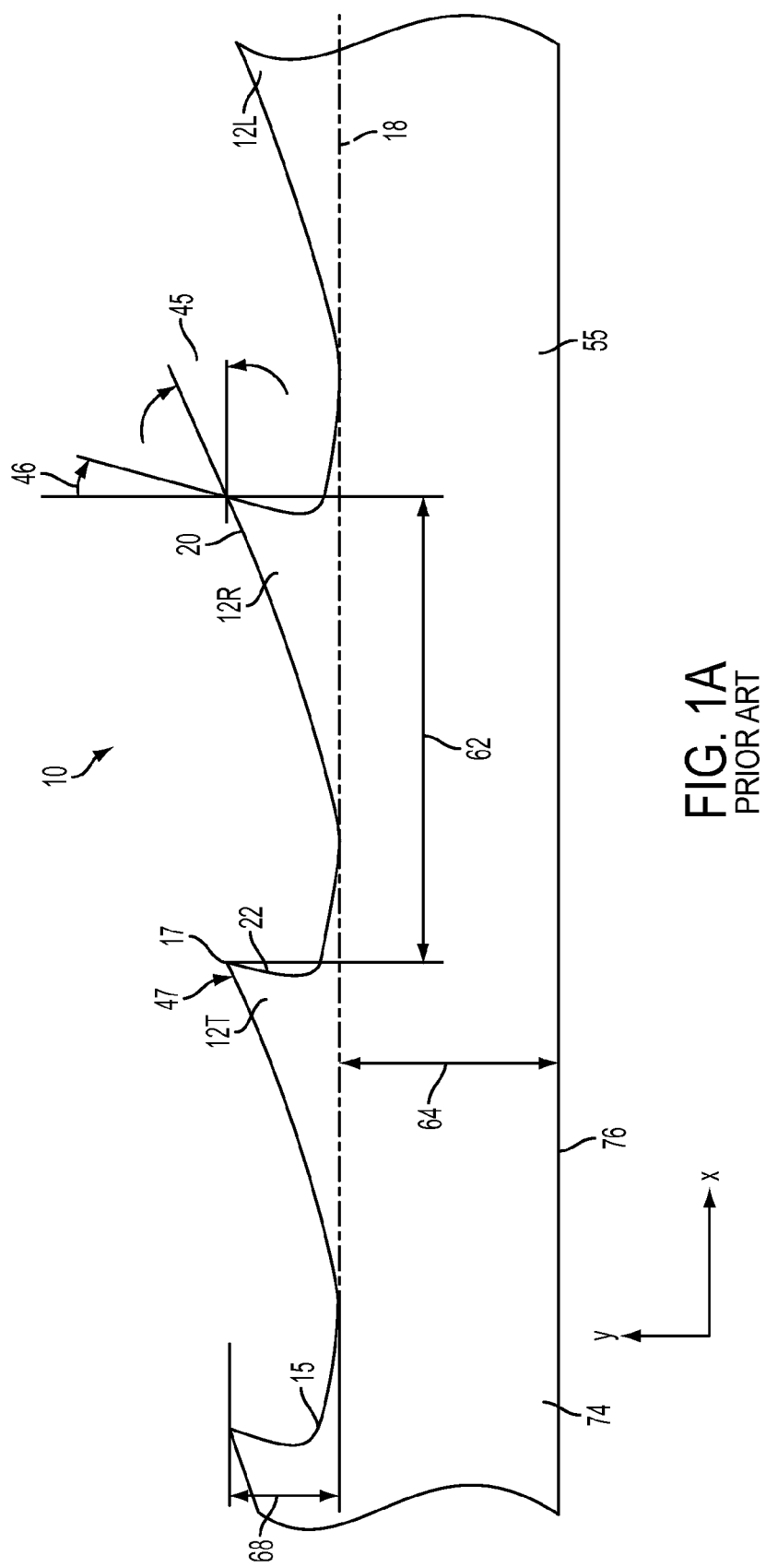
FIG. 1A is a partial close-up view of the cutting teeth of a prior art saw blade.

Turning now to FIG. 1A, a conventional blade 10 is generally illustrated having a plurality of teeth 12 that remove material from a work piece (not shown). The work piece may be metal, plastic, composite, stone, wood, or any other material that may be cut using a saw blade. The blade 10 moves in the x direction and the work piece moves in the negative y direction. A reference tooth 12R is adjacent to a leading tooth 12L, located in the x direction from the reference tooth 12R.

The leading tooth 12L removes some material from the work piece before the reference tooth 12R makes contact with the work piece. A trailing tooth 12T, also adjacent to the reference tooth 12R and located in the negative x direction from the reference tooth 12R, makes contact with the work piece some time after the reference tooth 12R has made contact. A band saw blade forms an endless loop, as is understood by those skilled in the art, so that each tooth repeatedly removes material from the work piece.

The teeth 12 of the blade 10 in FIG. 1A have an edge surface 17 (the point of the tooth) that cuts the work piece by penetrating into and removing material. Extending in the negative x direction and slightly downward (the negative y direction) from the edge surface 17 is the backside or back surface 20 of the tooth 12. The front side 22 of the blade 10 is often referred to as the face of the tooth 12. The lower part of the front side 22 is generally referred to as the gullet 15 of the tooth 12. The area of the blade 10 above, in the y direction, a reference line 18 is referred to as the tooth area of the blade 10 and has a height 68. The area of the blade 10 below, the negative y direction, the reference line 18 is a base 55 of the blade 10 and has a height 64. The distance between the teeth 12, measured in the x direction is referred to as the tooth spacing distance 62 as seen in FIG. 1A. The blade back surface 20 intersects the blade face 22 of the tooth 12 to form the edge 17. Each tooth has a back angle 45 that is defined as the angle between an extension of the back surface 20 at the edge 17 and a line parallel to the reference line and extending from the edge 17 as shown in FIG. 1A.

In addition to having a back angle 45, each tooth 12 has a rake angle 46 (sometimes referred to as the face or hook angle) that is measured between a vertical line extending upward, the y direction, from the tooth edge 17 and an upward extension of the face surface 22. The rake angle 46 as shown in FIG. 1A is a positive angle (measure from the vertical line in a clockwise direction) of around 10 degrees. Each tooth 12 of the conventional blade also has a tooth angle 47, defined as the angle between the back surface 20 and the face surface 22 of the tooth 12. Each tooth 12 of a saw has a gullet 15 below the tooth edge 17 that generally has a concave shape as shown in FIG. 1A.

The band saw blade 10 has a left side with a left side surface 74 and a right side with a right side surface 76. The sides, left side or right side, are defined and identified when an observer looks into the face 22 of the tooth 12 as being to the observer's left (the negative z direction) and to the observer's right (the z direction). When looking downward, the negative y direction, the top of tooth edges 17 can be seen. The conventional blade 10 has a thickness as measured between the left side surface 74 and a right side surface 72.

Although the sides of each tooth 12 are generally parallel to the sides of the base 55, the teeth 12 may set (bent outward in alternating directions) swaged or otherwise configured so as to provide a kerf (a space generated by the cutting) that is somewhat greater than the blade thickness, for example, twice the blade thickness. The kerf provides a widened path for passing the body of the blade 10 through the material being cut. In addition, the kerf serves as a channel for removal of material waste, such as, for example, sawdust in an industrial wood cutting operation. The gullet 15 of the conventional blade 10 serves as a scoop or collection point for pulling wood chips away from work piece and through the kerf formed by the planing action of the edges 17 of the teeth 12.

Figure 1B:
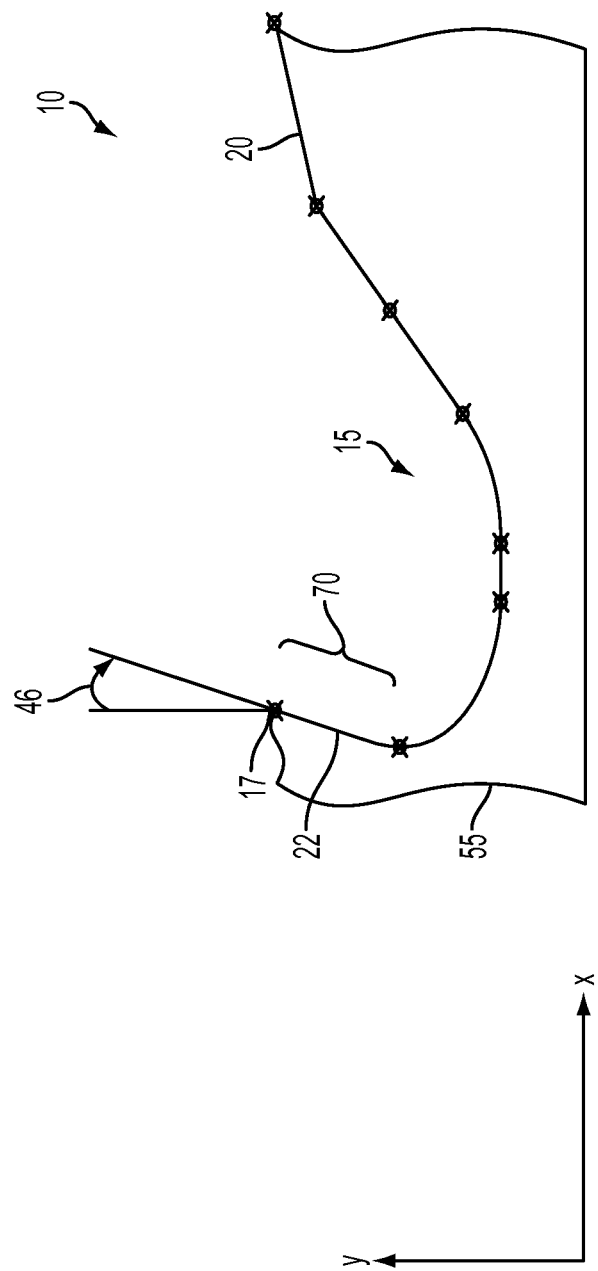
FIG. 1B is another partial close-up view of the cutting teeth of a prior art saw blade.

Turning now to FIG. 1B, an exploded view of one of the teeth 12 is generally illustrated which is consistent with the conventional blade 10 illustrated in FIG. 1A. As can be seen, the teeth 12 includes an area 70 extending from the tooth edge 17 towards the base 55 which has an initial rake 46 (i.e., the rake angle 46 of the teeth 12 prior to the blade being used for the first time) which is positive (measure from the vertical line in a clockwise direction) and is around 10 degrees. The area 70 of the tooth 12 has a substantially straight or linear outer face (i.e., cutting surface). As a result, the rake angle 46 of the tooth 12 remains substantially constant throughout the area 70 as the tooth edge 17 is worn during use and is therefore substantially the same as the initial rake angle 46 of the tooth 12. As may be appreciated, once the tooth edge 17 of the blade is worn below area 70, the blade 10 may be generally considered to be no longer operational. Nevertheless, it can be seen that that the area below area 70 (i.e., closer to the base 55) would have a rake angle that transitions from a positive rake angle to a negative rake angle (i.e., less aggressive).

In general, the rake angle of the cutting face of the tooth influences the cutting speed (i.e., as rake angle increases, the blade cuts faster) which is generally considered to be a beneficial feature. An increase in rake angle, however, may generally have a negative effect upon the tooth fracture resistance. In particular, an increase in rake angle may generally result in the tooth becoming more prone to fracture. As such, traditional blades have generally been constructed with a substantially constant rake angle which is based on a desired trade-off between cutting speed and fracture resistance.

Figure 11:
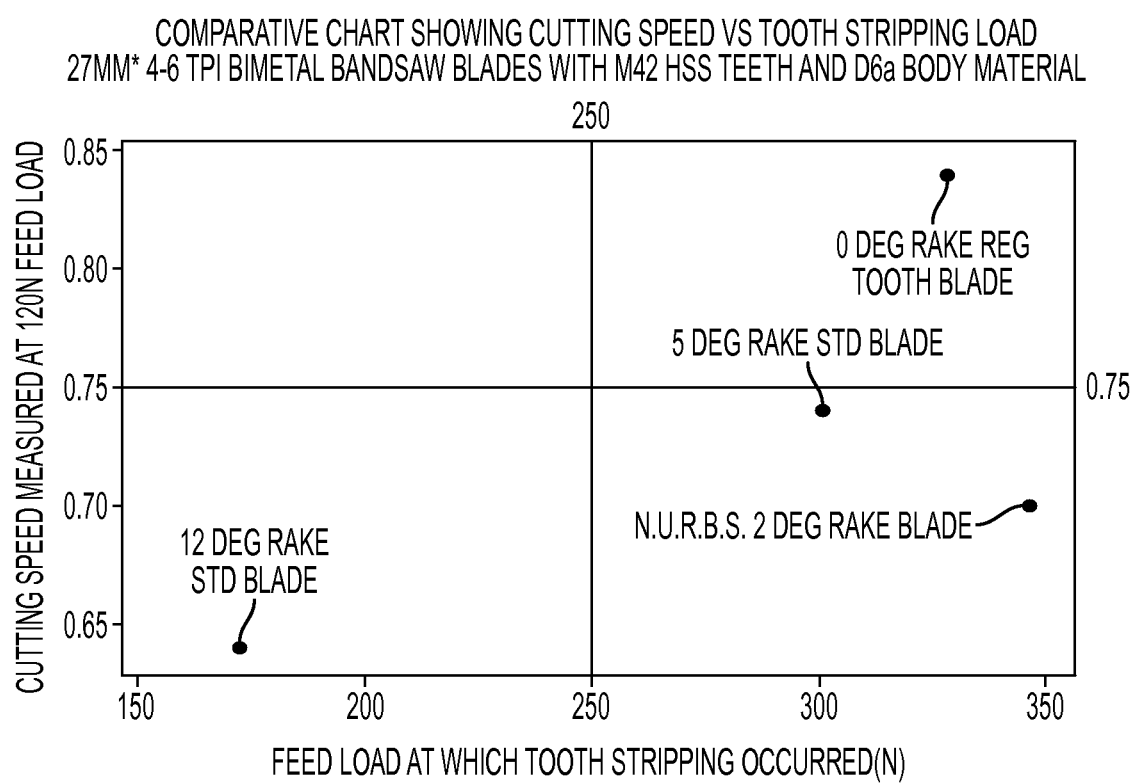
FIG. 11 is a chart showing cutting speed versus tooth stripping load.

In contrast to the above understanding, a blade consistent with the present disclosure may be constructed having a high tooth fracture resistance without sacrificing too much cutting speed. For example, tests were performed comparing a blade consistent with the present disclosure with designs. The results of some of these tests are shown in FIG. 11.

A blade consistent with the present disclosure may have a blade geometry configured not only to provide an initial rake angle in an unworn or new blade, but also to provide increased rake angle as the blade wears. Initially, therefore, the blade is less aggressive with a relatively low or approximately zero rake angle, which reduces overheating and increases tooth strength. As the blade wears, however, the blade may become more aggressive (increased rake angle compared to the initial rake angle). In one embodiment, for example, the blade rake angle may minimal, e.g. less than 2 degrees, but may increase, e.g. to about 5-10 degrees or more, as the tip of the blade wears.

Figure 2A:
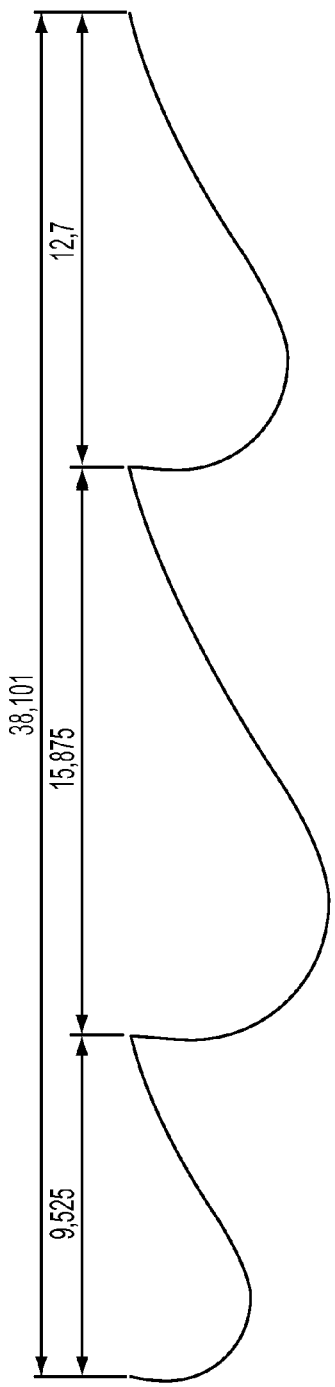
FIG. 2A is a side view of one embodiment of a saw blade consistent with the present disclosure.
Figure 2B:
FIG. 2B is a top view of the saw blade illustrated in FIG. 2A.
Figure 2C:
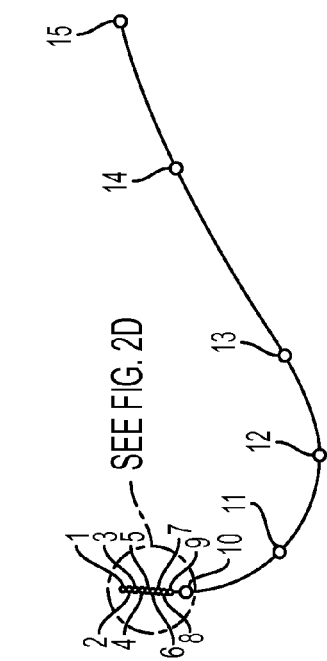
FIG. 2C is a detailed view of the tooth geometry of a tooth of the blade illustrated in FIG. 2A.

FIGS. 2A-2E illustrate one exemplary embodiment of a blade consistent with the present disclosure. As shown in FIG. 2A, the blade may include a plurality of teeth at different tooth spacings. The teeth may be set to form a kerf as illustrated in FIG. 2B. FIG. 2C illustrates the geometry of the teeth shown in FIG. 2A with the numbered points on the illustrated tooth corresponding to the position numbers and coordinates in FIG. 12.

Figure 2D:
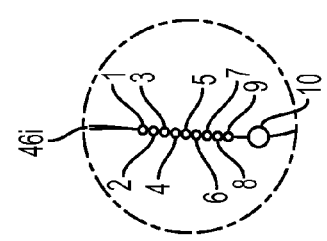
FIG. 2D is a detailed view of a tip portion of the tooth shown in FIG. 2C.
Figure 2E:
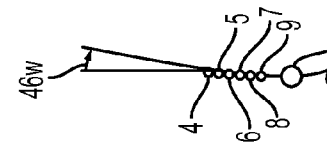
FIG. 2E is a detailed view of a tip portion of the tooth shown in FIG. 2C with positions 1, 2, and 3 worn from the tip portion of the tooth.

As shown in FIG. 2D, the tooth may initially have a minimal, e.g. approximately zero rake angle 46$i$. However, as the blade wears and, for example, the portion of the tip including positions 1, 2 and 3 are removed form the tip as shown in FIG. 2E, positions 4, 5 and 6 may define a new rake angle 46$w$ that is greater than the initial rake angle 46$i$. As used herein, the term "greater" is intended to mean moving more positively.

The blade consistent with at least one embodiment herein may thus become more aggressive with wear. In addition, it can be seen that the teeth of the blade, and in particular the cutting tip and/or the blade face of the teeth, may have a geometry having a substantially continuous, arcuate configuration. For example, the geometry of the teeth, and in particular the cutting tip and/or the blade face of the tooth, may generally have no straight or linear sections. This geometry may reduce and/or eliminate any deleterious stress concentrations which may occur at sharp transitions (e.g., a sharp transition between two adjacent linear sections). The geometry may also increase and/or smooth chip flow during use of the blade. As used herein, the phrase "linear section" or the like is intended to mean that a tooth, and in particular the cutting tip and/or the blade face of the tooth, is linear over a distance of at least 0.049 mm, for example, at least 0.064 mm, at least 0.086 mm, at least 0.132 mm, or at least 0.189 mm.

FIGS. 3A-3E illustrate another exemplary embodiment of a blade consistent with the present disclosure. FIG. 3C illustrates the geometry of the teeth shown in FIG. 3A with the numbered points on the illustrated tooth corresponding to the position numbers and coordinates in FIG. 13.

FIGS. 4A-4E illustrate another exemplary embodiment of a blade consistent with the present disclosure. FIG. 4C illustrates the geometry of the teeth shown in FIG. 4A with the numbered points on the illustrated tooth corresponding to the position numbers and coordinates in FIG. 14.

Figure 5A:
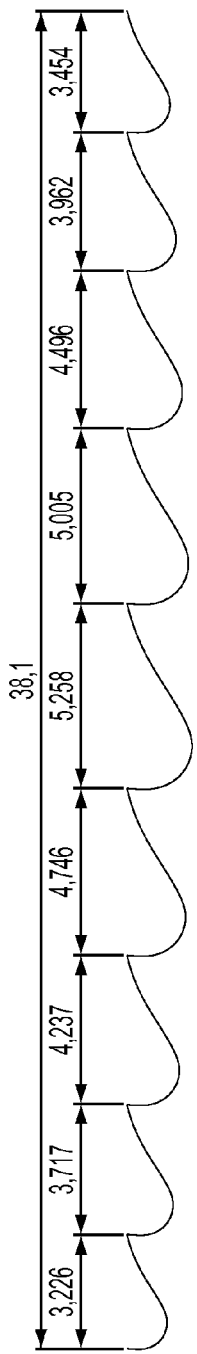
FIG. 5A is a side view of another embodiment of a saw blade consistent with the present disclosure.
Figure 5B:
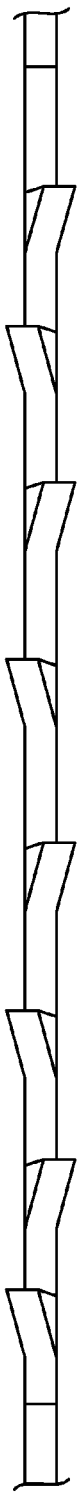
FIG. 5B is a top view of the saw blade illustrated in FIG. 5A.
Figure 5D:
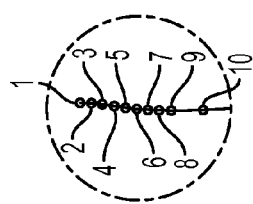
FIG. 5D is a detailed view of a tip portion of the tooth shown in FIG. 5C.
Figure 5C:
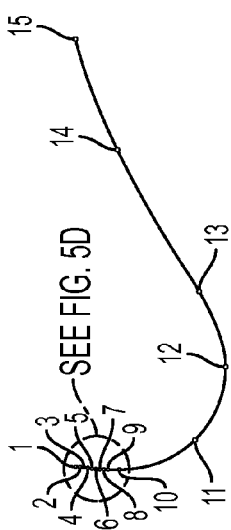
FIG. 5C is a detailed view of the tooth geometry of a tooth of the blade illustrated in FIG. 5A.

FIGS. 5A-5E illustrate another exemplary embodiment of a blade consistent with the present disclosure. FIG. 5C illustrates the geometry of the teeth shown in FIG. 5A with the numbered points on the illustrated tooth corresponding to the position numbers and coordinates in FIG. 15.

Figure 6A:
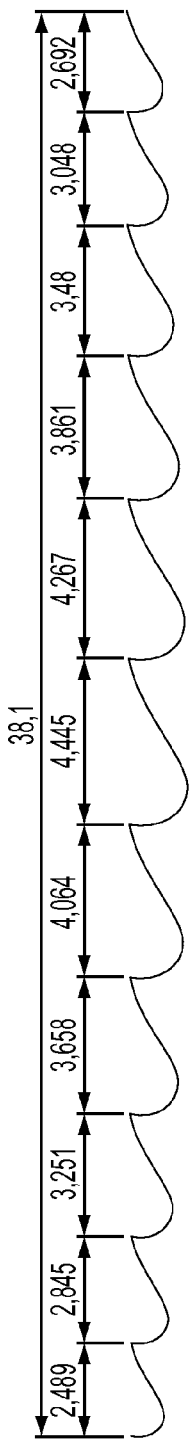
FIG. 6A is a side view of another embodiment of a saw blade consistent with the present disclosure.
Figure 6B:
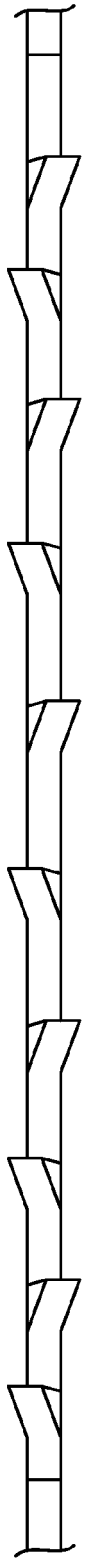
FIG. 6B is a top view of the saw blade illustrated in FIG. 6A.
Figure 6D:
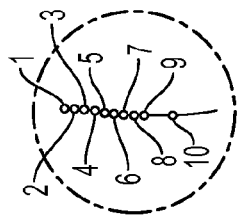
FIG. 6D is a detailed view of a tip portion of the tooth shown in FIG. 6C.
Figure 6C:
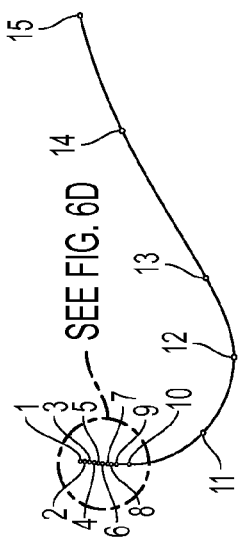
FIG. 6C is a detailed view of the tooth geometry of a tooth of the blade illustrated in FIG. 6A.

FIGS. 6A-6E illustrate another exemplary embodiment of a blade consistent with the present disclosure. FIG. 6C illustrates the geometry of the teeth shown in FIG. 6A with the numbered points on the illustrated tooth corresponding to the position numbers and coordinates in FIG. 16.

Figure 7:
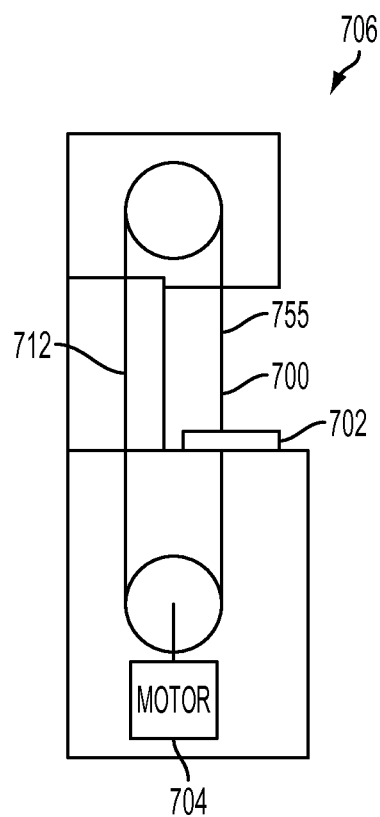
FIG. 7 is a diagrammatic view of a band saw including a blade consistent with the present disclosure.

Referring now to FIG. 7, a blade 700 consistent with the present disclosure is shown affixed to a typical bandsaw 706, in the act of through-sawing a piece of material 702. As may be appreciated, the blade 700 may include a body 755 defining a continuous loop having a plurality of teeth 712 disposed along at least one outer edge. In operation, the motor 704 may be energized to cause continuous motion/rotation of the blade 700 in a single direction. As the blade 700 moves against the material 702, the teeth 712 may saw the material 702 downwardly from the top surface (i.e., the blade 700 may rotate clock-wise).

Figure 8:
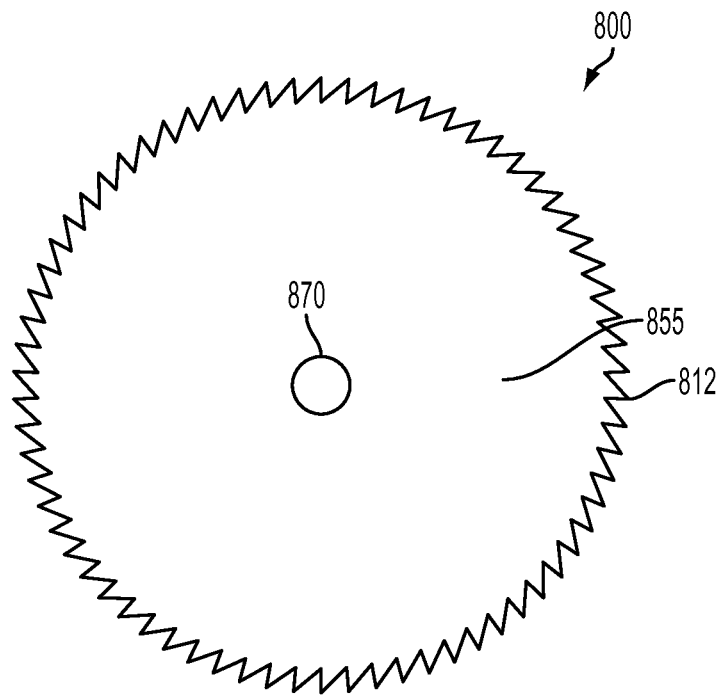
FIG. 8 is a side view of another embodiment of a saw blade having a generally circular base configuration.
Figure 9:
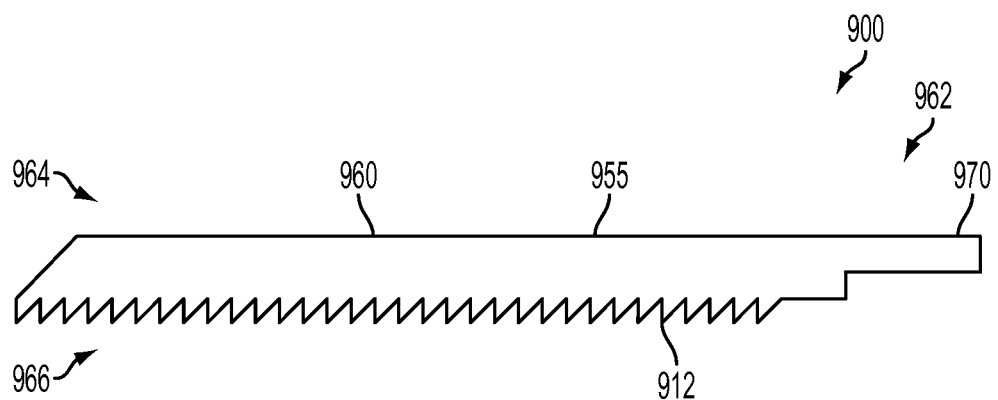
FIG. 9 is a side view of yet another embodiment of a saw blade having a generally elongated, linear base configuration.

Referring now to FIGS. 8 and 9, other configurations of a blade consistent with the present disclosure are generally illustrated. For example, a blade 800 is generally illustrated in FIG. 8 having a base 855 defining a generally circular configuration. The base 855 may include a mounting feature 870 such as, but not limited to, an opening, slot or the like, configured to couple the blade 800 to a saw (not shown) for example, but not limited to, a circular saw or the like. The base 855 may also include a plurality of teeth 812 disposed about a perimeter of the base 855. Accordingly to at least one embodiment, one or more of the teeth 812 may comprises a first and a second portion wherein the first portion includes a cutting tip having an initial rake angle and the second portion includes a cutting tip having a second rake angle greater than the initial rake angle as generally described herein.

Referring now to FIG. 9, a blade 900 may include a base 955 defining a generally elongated, linear section 960 having a first 962 and second end 964 disposed generally opposite to each other. As used herein, the term "generally elongated, linear section" is intended to mean that the section has a disposed along the longitudinal axis between the first 962 and second ends 964 which is greater than the width (i.e., the direction perpendicular to the longitudinal axis and perpendicular to the plane illustrated in FIG. 9). For example, the length of section 960 may be at least 5 times greater than the width, at least 10 times greater the width or more.

The first end 962 may include a mounting feature 970 (for example, but not limited to, a protrusion or the like) configured to be coupled to a saw (not shown) such as but not limited to, a reciprocating saw or the like. The base 955 may include a plurality of teeth 912 disposed along at least one edge 966. Accordingly to at least one embodiment, one or more of the teeth 812 may comprises a first and a second portion wherein the first portion includes a cutting tip having an initial rake angle and the second portion includes a cutting tip having a second rake angle greater than the initial rake angle as generally described herein.

Figure 10:
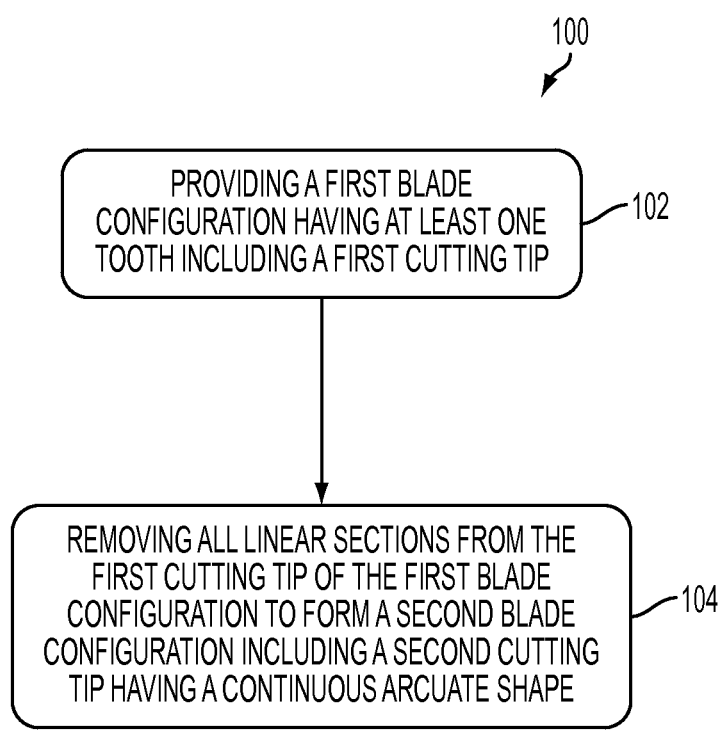
FIG. 10 is a flow chart illustrating one embodiment of a method for forming a blade.

The blade geometries illustrated in FIGS. 2-9 may be formed by joining the coordinate points illustrated in FIGS. 12-16 using a Non-Uniform Rational B-Spline (NURBS). For example, one embodiment of a method 100 of forming a blade consistent with the present disclosure is generally illustrated in FIG. 10. The method 100 may comprise providing a first blade configuration having at least one tooth including a first cutting tip, block 102. For example, the method 100 may include providing a plurality of data points corresponding to the first cutting tip of the first blade configuration. The first cutting tip of the first blade configuration may include one or more linear portions. For example, the first cutting tip may include at least adjacent linear sections.

The method 100 may also include forming a second blade configuration based on the first configuration. For example, the method 100 may include removing all linear sections from the first cutting tip of the first blade configuration to form a second blade configuration including a second cutting tip having a continuous arcuate shape, block 104. According to at least one embodiment, the method 100 may include joining the plurality of data points corresponding to the first blade configuration using a spline command to remove all linear sections to form the second cutting tip. For example, the plurality of data points may be joined to form the second cutting tip using Non-Uniform Rational B-Spline (N.U.R.B.S.) geometry.

The second blade configuration may include a base and a plurality of teeth extending generally outwardly from the base, wherein at least one of the plurality of teeth includes the second cutting tip. For example, the second blade configuration may comprise a first and a second portion. The first portion may include a cutting tip having an initial rake angle and the second portion may include a cutting tip having a second rake angle greater than the initial rake angle when the material of the first portion is worn from the tip. The initial rake angle may be approximately zero and the second rake angle may move more positively as the second section is worn away.

According to one aspect of the present disclosure, there is provided a saw blade a base and a plurality of teeth extending generally outwardly from the base. At least one of the plurality of teeth may comprise a first and a second portion. The first portion may include a cutting tip having an initial rake angle and the second portion may include a cutting tip having a second rake angle greater than the initial rake angle. The second portion may be disposed closer to the base than the first portion.

According to another aspect of the present disclosure, there is provided a system comprising a blade and a motor configured to move the blade. The blade may include a base and a plurality of teeth extending generally outwardly from the base. At least one of the plurality of teeth may include a first and a second portion. The first portion may include a cutting tip having an initial rake angle and the second portion may include a cutting tip having a second rake angle greater than the initial rake angle. The second portion may be disposed closer to the base than the first portion.

According to yet another aspect of the present disclosure, there is provided a method for forming a blade. The method may include providing a first blade configuration having at least one tooth including a first cutting tip. The method may also include removing all linear sections from the first cutting tip of the first blade configuration to form a second blade configuration including a second cutting tip having a continuous arcuate shape. The method may optionally include providing a plurality of data points corresponding to the first cutting tip of the first blade configuration and joining the plurality of data points using a spline command to remove all linear sections to form the second cutting tip. The plurality of data points may optionally be joined to form the second cutting tip using Non-Uniform Rational B-Spline (N.U.R.B.S.) geometry.

The embodiments that have been described herein are set forth herein by way of illustration but not of limitation. Many other embodiments, which will be readily apparent to those of ordinary skill in the art, may be made without departing materially from the spirit and scope of the disclosure.

What is claimed is:

1. A saw blade comprising:
   a base; and
   a plurality of teeth extending generally outwardly from said base, wherein at least one of said plurality of teeth comprises:
   a back surface;
   a face surface intersecting with said back surface forming a cutting edge to remove material from a work piece, said face surface having a first portion and a second portion defined along a length thereof, wherein said first portion is disposed closer to said cutting edge than said second portion and said second portion is disposed closer to said base than said first portion;
   said first portion of said face surface having an initial rake angle defined by the angle between a line extending approximately perpendicular to a cutting direction of said at least one tooth and a line extending away from said base and along said first portion face surface, wherein said initial rake angle is greater than or equal zero degrees; and
   said second portion of said face surface having at least one second rake angle defined by the angle between said approximately perpendicular line and a line extending away from said base and along said second portion of said face surface, wherein said second rake angle of said face surface is more positive than said initial rake angle of said face surface;
   wherein said cutting edge is initially defined by said first portion of said face surface, and wherein said cutting edge is defined by said second portion of said face surface after said first portion of said face surface is worn away during use of said saw blade to remove material from said work piece; and
   a gullet extending from said second portion of said face surface to a back surface of an adjacent one of said plurality of teeth.

2. The saw blade of claim 1, wherein said face surface of said at least one tooth has a substantially continuous, arcuate configuration.

3. The saw blade of claim 1, wherein said plurality of teeth include a plurality of different teeth spacings.

4. The saw blade of claim 1, wherein one or more of said plurality of teeth is configured to provide a kerf that is greater than a thickness of said blade.

5. The saw blade of claim 1, wherein said second rake angle moves more positively as said second portion of said face surface of said at least one tooth is worn away.

6. The saw blade of claim 1, wherein said base defines a continuous loop.

7. The saw blade of claim 1, wherein said base defines a generally circular configuration.

8. The saw blade of claim 1, wherein said base defines a generally elongated, linear section having a first and second end disposed generally opposite to each other.

9. A system comprising:
   a blade comprising a base and a plurality of teeth extending generally outwardly from said base, wherein at least one of said plurality of teeth comprises:
   a back surface;
   a face surface intersecting with said back surface and forming a cutting edge to remove material from a work piece, said face surface having a first portion and a second portion defined along a length thereof, wherein said first portion is disposed closer to said cutting edge than said second portion and said second portion is disposed closer to said base than said first portion;
   said first portion of said face surface having an initial rake angle defined by the angle between a line extending approximately perpendicular to a cutting direction of said at least one tooth and a line extending away from said base and along said first portion of said face surface, wherein said initial rake angle is greater than or equal zero degrees;
   said second portion of said face surface having at least one second rake angle defined by the angle between said approximately perpendicular line and a line extending away from said base and along said second portion of said face surface along a length of said second portion, wherein said second rake angle is more positive than said initial rake angle of said face surface;
   wherein said cutting edge is initially defined by said first portion of said face surface, and wherein said cutting edge is defined by said second portion of said face surface after said first portion of said face surface is worn away during use of said saw blade to remove material from said work piece; and
   a gullet extending from said second portion of said face surface to a back surface of an adjacent one of said plurality of teeth; and
   a motor configured to move said blade.

10. The system of claim 9, wherein said base defines a continuous loop.

11. The system of claim 10, wherein said system comprises a bandsaw and wherein said motor is configured to rotate said blade continuously in a single direction when said motor is energized.

12. The system of claim 9, wherein said base defines a generally circular configuration.

13. The system of claim 9, wherein said base defines a generally elongated, linear section having a first and second end disposed generally opposite to each other.

14. The system of claim 9, wherein said face surface of said at least one tooth has a substantially continuous, arcuate configuration.

15. The system of claim 9, wherein said second rake angle moves more positively as said second portion of said face surface of said at least one tooth is worn away.

16. A method comprising:
providing a first blade configuration having a base and a plurality of teeth extending generally outwardly from said base, wherein at least one tooth includes a back surface and a face surface intersecting one another and forming a first cutting edge; and
removing one or more sections from at least said face surface of said at least one tooth to form a second blade configuration, wherein said back surface and said face surface intersect one another and form a second cutting edge to remove material from a work piece, said face surface of said second blade configuration having a first portion and a second portion defined along a length thereof, said first portion having an initial rake angle and said second portion having at least a second rake angle, wherein said initial rake angle is the angle between a line extending approximately perpendicular to a cutting direction of said at least one tooth and a line extending away from said base and along said face surface along a length of said first portion and said second rake angle is the angle between said approximately perpendicular line and a line extending away from said base and along said face surface along a length of said second portion, said at least one tooth further including a gullet extending from said second portion of said face surface to a back surface of an adjacent one of said plurality of teeth,
wherein said initial rake angle is greater than or equal zero degrees, and wherein said second rake angle is more positive than said initial rake angle, and
wherein said second cutting edge is initially defined by said first portion of said face surface, and wherein said second cutting edge is defined by said second portion of said face surface after said first portion of said face surface is worn away during use of said saw blade to remove material from said work piece.

17. The method of claim 16, wherein at least one of said plurality of teeth includes said second cutting edge.

18. The method of claim 16, wherein at least said face surface of said at least one tooth of said first blade configuration includes at least two adjacent linear sections.

19. The method of claim 16, further comprising:
providing a plurality of data points corresponding to said face surface of said first cutting edge of said first blade configuration; and
joining said plurality of data points using a spline command to remove linear sections along a length of said face surface to form said at least one tooth of said second blade configuration.

20. The method of claim 19, wherein said plurality of data points are joined to form said face surface of said at least one tooth of said second blade configuration includes Non-Uniform Rational B-Spline (N.U.R.B.S.) geometry.

21. The method of claim 16, wherein said second rake angle moves more positively as said second portion of said face surface at said least one tooth is worn away.

22. The method of claim 16, wherein said second blade configuration defines a continuous loop having said plurality of teeth disposed about an outer edge.

* * * * *